(No Model.)  2 Sheets—Sheet 1.
C. QUAST.
TRACTION ENGINE.
No. 588,877. Patented Aug. 24, 1897.
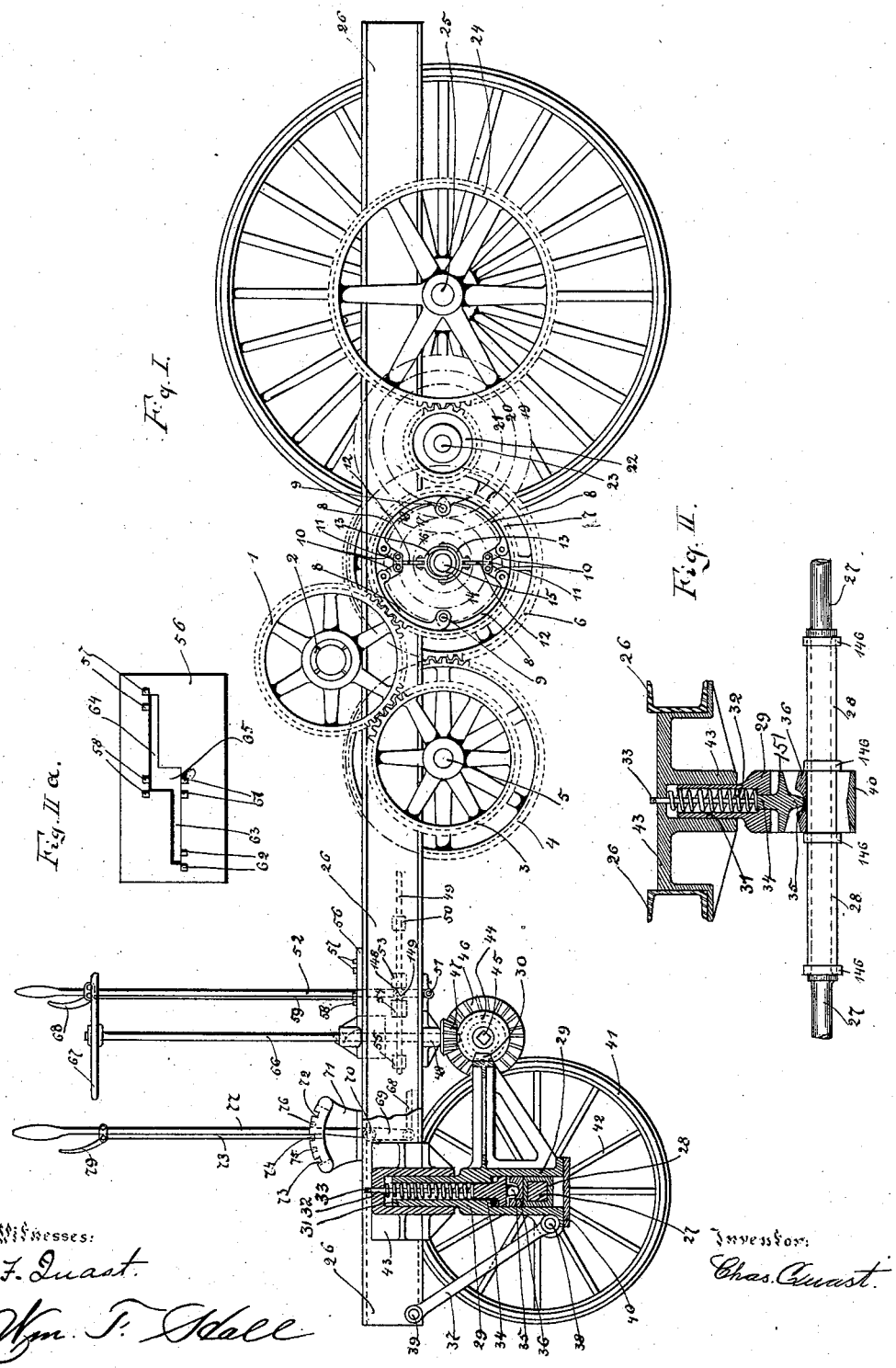
Witnesses:
E. F. Quast.
Wm. T. Hall.
Inventor:
Chas. Quast.

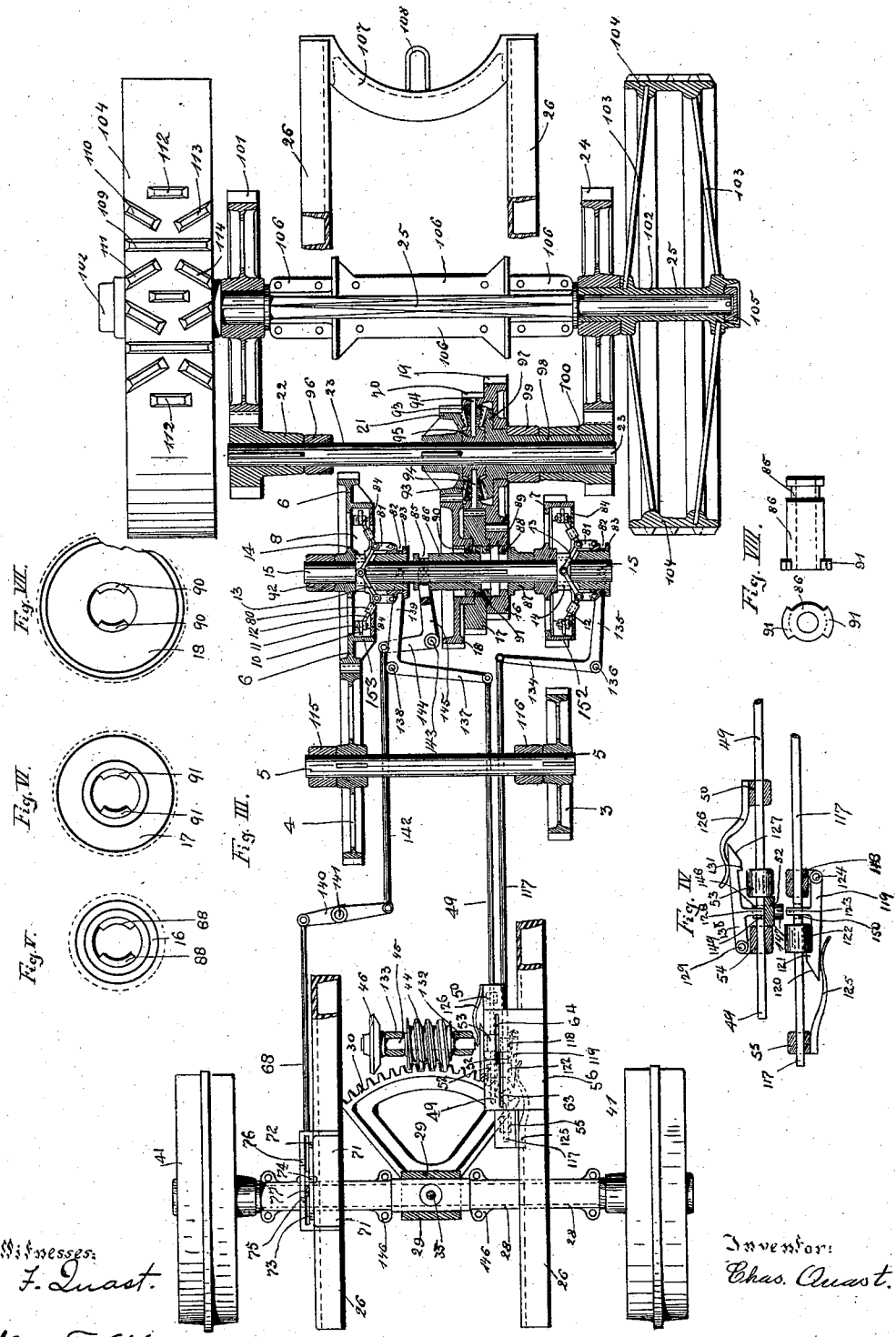

UNITED STATES PATENT OFFICE.

CHARLES QUAST, OF MARION, OHIO.

TRACTION-ENGINE.

SPECIFICATION forming part of Letters Patent No. 588,877, dated August 24, 1897.

Application filed February 24, 1894. Renewed May 27, 1896. Serial No. 593,353. (No model.)

*To all whom it may concern:*

Be it known that I, CHARLES QUAST, a citizen of the United States, residing at Marion, in the county of Marion and State of Ohio, have invented certain new and useful Improvements in Traction-Engines, of which the following is a specification, reference being had therein to the accompanying drawings.

Figure I is a side view and section of the steering mechanism. Fig. II is a cross-section through axle-support. Fig. II$^a$ is a top view of the clutch-lever plate. Fig. III is a plan section of traction mechanism; Fig. IV, details of clutch-operating mechanism. Figs. V, VI, VII, and VIII are details of speeding-gear.

1 is a spur-gear carried by the driving-shaft of the driving-motor. (Not shown.) 2 2 are coupling-jaws carried by gear 1 to engage a coupling-sleeve on the driving-shaft of the driving-motor. Spur-gear 1 meshes in spur-gears 3 and 7 on shafts 5 and 15, respectively. Spur-gear 7 carries a friction-ring and is loose on shaft 15. Shaft 15 carries, keyed thereto, a clutch-plate 84, which carries, through pins 9, friction-shoes 8. Friction-shoes 8 have an eccentric form where pivoted on pins 9 and connect at the other end through connecting-pieces 10 with cross-piece 11. 11 carries toggle-levers 12, the latter connected through set-up screw 80 with toggle-lever 13. Clutch-sleeve 83 carries links 81, which are connected with the toggle-levers 12 and 13. Toggle-levers 13 are pivoted on collar 14, which is loose on shaft 15 and movable in the direction of the toggle-levers only. The shaft 5 has keyed thereto the gear 4, which meshes with spur-gear 6. Spur-gear 6 has a clutch-ring, clutch-shoes, toggle-levers, and clutch-sleeve, substantially as spur-gear 7.

Shaft 15 carries loosely spur-gears 16, 17, and 18, which have coupling-jaws 88, 89, and 90, respectively. Said shaft carries on a sliding key the coupling-sleeve 86, which has coupling-jaws 91 to match coupling-jaws of spur-gears 16, 17, and 18. Spur-gears 16, 17, and 18 mesh in spur-gears 19, 20, and 21, respectively, on the shaft 23. Spur-gears 19 and 20 are one piece, and are loose on bevel-gear 97, and are carried by the hub 95, which is loose on the shaft 23. Spur-gear 21 is keyed on shaft 23, and is formed with a bevel-gear toward the inside to mesh with pinions 93, which are carried by pins 94 of spur-gear 20 on hub 95. Pinions 93 mesh in bevel-gear 97, which is loose on shaft 23 and which carries rigidly by its hub 98 the spur-gear 100. Shaft 23 carries on its other end, keyed on, spur-gear 22. Spur-gears 22 and 100 mesh, respectively, in spur-gears 101 and 24, respectively keyed on the hub 102 of traction-wheels 104, the latter carried by axle 25, which is supported and strengthened by casting 106, the latter bolted to channel-beams 26 and 26.

Lever 52 is pivoted at its lower end at 51 and carries a latch-bar 59 and latch-handle 60. This lever is the so-called "starting-lever," and can be moved in slots 63, 65, and 64 of lever-plate 56. Clutch-rods 117 and 49 move in bearings 55, 118, 54, and 50 and carry fixed collars 122 and 53, respectively.

Bearings 118 and 54 have latch-hooks 119 and 130 pivoted at 124 and 129, said latch-hooks being pressed toward the clutch-rods by springs 125 and 126, carried by bearings 55 and 50, respectively. Lever 52 has pins 147 and 148 projecting on both sides to fit in holes 150 and 149 of clutch-rods 117 and 49.

Latch-hooks 119 and 130 have projections 123 and 128 opposite lever 52 when said lever is in central position engaging slot 65 of plate 56, Figs. II$^a$ and III. Clutch-rods 117 and 49 connect with levers 134 and 137, fulcrumed at 136 and 138, the latter connected at their forked ends 135 and 139 with clutch-collars 83 by grooves 82 of the clutches. Lever 77, carrying latch-rod 78, pivoted at 70, and connected through lever 69 and rod 68, lever 140 and rod 142, and lever 144 and 145 through groove 85 with coupling-sleeve 86. Quadrant 71 has notches 72, 74, and 73 on one side and 76 and 75 on the other side.

Front axle 27 rests in strengthening-frame 28, fastened by collars 146. Axle 27 and frame 28 rest in piece 29 and are kept from moving longitudinally by collars 146, between which collars is supporting-piece 36, having a ball-socket to support pin 35 of piece 151, which has on the other end pin 34, which slides in 29 and supports one end of spring 32. Spring 32 is confined in sleeve 31 of piece 29, said sleeve being loose in casting 43, which is bolted to channels 26 and 26. Piece 151 carries firmly rod 33, which projects through casting 43 with its upper end, where a pin is inserted, which prevents sleeve 31, rod 33, piece 29, and piece 151 from falling out of casting 43. Cross-piece 40 is bolted on the open bottom of piece 29 and prevents piece 36, axle-support 28, and axle 27 from leaving piece 29. Rod 37 fastens at one end on 39 and in ball-joint 38, thus stiffening and supporting piece 29.

Rod 66, carrying on its upper end hand-wheel 67 and bearing on the lower end in bearing 48, carries bevel-pinion 47, the latter meshing in bevel-gear 46, which is fixed on axle 45, which carries worm 44, which meshes in worm-gear segment 30. Axle 45 is supported by bearings 133 and 132. Worm-gear segment 30 is carried by piece 29.

The operation is as follows: Spur-gear 1 on the motor-shaft is in a continual one-direction rotary motion and meshes with spur-gears 3 and 7, spur-gear 3 transmitting the motion through shaft 5 and spur-gear 4 to spur-gear 6. Spur-gears 7 and 6 rotate in opposite directions, caused by counter-shaft 5. Said spur-gears carry friction-rings 152 and 153. Shaft 15, which is loose in gears 7 and 6, carries keyed thereon clutch-plates 84, which carry on pins 9 clutch-shoes 8. On the hub of said clutch-plates slide clutch-sleeves 83. As collars 83 are shoved toward the gear-wheel toggle-levers 12 and 13 are brought in a straight line through link 81, thus moving pieces 11 toward the periphery of the clutch-ring and spreading pieces 10 on their outer ends. The outer ends of pieces 10 connect with the loose ends of clutch-shoes 8. Said clutch-shoes 8 are pressed against the friction-rim during the first part of the spreading of pieces 10, and during the latter part of the motion will turn around pin 9, and so locking the clutch. Clutch-shoes 8 have the shape of an eccentric where pivoted on pin 9, and as said shoes are placed in right and left positions the friction-ring will have a tendency in either direction of motion to turn a pair of clutch-shoes 8 around pin 9, the circle of that part of clutch-shoes 8 having its center in such location that the turning of the clutch-shoes 8 in an outward direction will increase the distance between the outer surface of said shoes and the center of pin 9, and thus prevents the friction-ring from turning or even slipping when the clutch is in action, for the more the friction-ring moves the more pressure will be exerted between clutch rings and pins. Each set of clutch-shoes has its separate toggle, also a spreading toggle, composed of levers 10. The centrical toggle presses outward and the outside toggles press in a spreading direction toward pins 9. The motion of shaft 15 is transmitted through sliding sleeve 86, which has coupling-jaws 91 for either spur-gear 16, 17, or 18, which have corresponding coupling-jaws 88, 89, and 90, respectively. Said gears transmit their motion through loose spur-gears 19 20 and fixed gear 21 upon shaft 23 and bevel-gear 97. Shaft 23 and bevel-gear 97 carry pinions 100 and 22 and transmit the motion received upon spur-gears 24 and 101, the latter being fixed firmly to wheels 104. Spur-gear 21 is keyed to shaft 23 and is combined with a bevel-gear which meshes in bevel-pinions 93, which are carried through pins 94 by gear 20 and its hub 95, the latter loose on shaft 23. Shaft 23 carries loosely the bevel-gear 97 between gears 19 and 21, matching in pinions 93. This combination of gears comprises a compensating-gear, as either 19, 20, or 21 can be driven and can transmit one part of their power as a positive upon spur-gear 22, while the remainder may be transmitted through bevel-gear 97 to spur-gear 100 in unequal speeds or in opposite directions, which is desirable in making curves either in going forward or in backing up. When lever 52 is moved in groove 64, clutch-rod 49 is operated upon, and when in groove 63, clutch-rod 117. Lever 52, in its central position, stands in groove 65 between projections 123 and 128 of latch-hooks 119 and 130, which are pressed against collars 122 and 53 by springs 125 and 126. As lever 52 is moved toward 49 projection 128 is shoved back and latch 131 is freed from collar 53, and pin 148 of lever 52 will enter hole 149 of rod 49, thus locking rod 49 to lever 52, and in moving lever 52 toward the end of groove 64 said lever will press against collar 53 and not against pin 149, and as collar 53 is fixed on the rod said rod will be moved. At the end of groove 64 are lugs 57, between which fits latch-rod 59 to hold lever 52 in that position. Through this motion rod 49 has moved levers 137 and 139, the latter gliding in groove 82 of clutch-sleeve 83 and has brought that clutch in operation by shoving the clutch-sleeve inward and bringing the toggles in straight position, which causes the clutch-shoes to spread and transmit the motion of spur-wheel 6 through clutch-plate upon shaft 15.

In moving lever 52 toward the center 65 of the plate 56, rod 49, levers, toggles, and clutch-shoes will move into the former position and break connection between the spur-wheel 6 and shaft 15. By letting lever 52 go springs 126 will press the latch against the lever, and hook 131 will lock rod 49. By moving lever 52 backward the lever will touch and shove the latch-hook by inclined surface 127 out of the way, so as to pass the collar between projection 128 and latch 131. The same applies for rod 117 with its connections and gear 7 and clutch therein. Only one clutch can be in operation while the other is locked or both can be out of operation and both locked. There is no strain on the lever or the lever connections after the toggles are brought in a straight position, as they move a little over the center, taking any side pressure from the collar 83. Lever 77 is the speeding-lever, moving in quadrant 71, which has a notch for latch-rod 78 for each position of the coupling-sleeve 86. Lever 77 connects through rod 68, lever 140, and rod 142 with lever 144, which with its forked end 145 engages groove 85 of sleeve 86. The latter has coupling-jaws 91 matching coupling-jaws 88, 89, and 90 of spur-gears 16, 17, and 18. Between the jaws of each wheel is a space for the jaws 91 of sleeve 86 to be disengaged. Sleeve 86 is splined on shaft 15 and transmits the motion given by gears 6 and 7 upon said shaft to gears 19, 20, and 21, and through this to the traction-wheels 104. Quadrant 71 has notches 72, 74, and 73 on one side for speeds and on the other side notches 76 and 75 for stopping the traction or changing speeds. Hand-wheel 67 on shaft 66 transmits any motion through bevel-pinion 47 and bevel-gear 46, shaft 45, worm 44, and worm-gear segment to the steering-support 29, and so steer the axle and wheels. The traction-wheels 104 have hubs 102 with cast-in arms 103, the latter also cast in the rim of the wheel 104, as shown in Fig. III. This rim has prongs 109, 110, 111, 112, 113, and 114 cast on in a peculiar manner. The cross-prong 109 reaches clear across in a right angle, where prongs 110, 111, 113, and 114 point diagonally to the center of said prongs 109, but do not touch them. Short prongs 112 between prongs 110, 111, 113, and 114 are transversely of the rim. The arrangement of the prongs creates a suction in mud and sand and prevents the wheels from slipping. Piece 107 is bolted between channels 25 and 26 and has a hook 108 to connect vehicles or the like.

Referring again to the gearing on the shaft 23, in turning a long curve with the wheel connected with the gear 97 to the inside and the wheel connected to the shaft 23 to the outside the wheel on the outside will have to travel over more ground than the wheel on the inside. As the power applied to the wheels is the same the inside wheel will cause bevel-gear 97 to move slower than shaft 23. In doing so shaft 23, gear 21, keyed on same, and the bevel-gear on gear 21 will cause the bevel-gears 93 to turn, thus allowing bevel-gear 97 and the inside wheel to move slower. By turning a curve the other way bevel-gear 97 runs faster than shaft 23, thus causing the pinions 93 to turn in an opposite direction. The pinions 93 thus form a rolling or compensating connection between the gears 97 and 21, and thus between the two wheels.

Either of the gears 16, 17, or 18 may be fixed with shaft 15 through coupling-sleeve 86, and either of gears 19, 20, or 21 may be operated upon and obtain the same effect, for the reason that by driving 18 and 21 the power will be transmitted through bevel-gear of gear 21 and pinions 93 upon bevel-gear 97. Either of these bevel-gears may turn ahead of the other as the traction turns. In driving through gears 17 and 20 the power will be transmitted through pinions 93 upon bevel-gear 97 and the bevel-gear of gear 21, and likewise in driving through gears 16 and 19.

I claim—

1. In combination, in a traction-engine, the driving mechanism, the front axle, the frame to which said axle is pivoted, the pivot-standard 29 in which the axle may move vertically, the spring for applying a tension to said axle tending to force the same down, the worm and operating means therefor and the segment connected with the pivot-standard 29, substantially as described.

2. In combination in a traction-engine, the frame, the driving mechanism, the front axle, the hollow standard carrying the same and in which the axle may have vertical movement, the pivot-block 151 having the bearing-point 35 by which lateral tilting of the axle is allowed said block being arranged to move vertically and be guided in the pivot-standard, the spring for forcing the block down and the steering mechanism connected with the standard, substantially as described.

3. In combination in a traction-engine, the frame, the driving mechanism, the vertically-movable axle at the front of the frame, the vertically-movable block having a pivot-point 35 to permit lateral tipping of the spring for forcing the block downward, and the means for steering the machine connected with the front axle, substantially as described.

4. In a traction-engine, the combination of the driving mechanism, the transmitter-shaft 15, the clutch-wheels thereon, the clutch-shoes 8, 8, pivoted on pins 9 and having eccentric portions at their pivotal points to bear on the wheel-rim, the toggle-arms 10 connected to the free ends of the clutch-shoes and the means for operating said arms, substantially as described.

5. In combination in a traction-engine, the driving mechanism, the transmitting-shaft 15, the clutch-wheel, the clutch-shoes 8 pivotally supported and having the toggle-arms 10 at their outer ends, the sliding collars 14 and 83, the arms 13 connected to the collar 14, the arms 81 connecting said arms with the collar 83 and the means for operating the collar 83, substantially as described.

6. In combination, in a traction-engine, the driving-shaft, the transmitting-shaft, the two clutch-wheels thereon, the connections 49 and 117 for operating said clutches in and out and the hand-lever for operating the rods 49 and 117, said hand-lever being arranged between the rods and adapted to be attached to either of them by being shifted laterally to engage the same whereby either clutch may be operated at a time but not together, substantially as described.

7. In combination, in a traction-engine, the driving mechanism, the transmitting-shaft, the clutches thereon, the rods 49 and 117 for operating said clutches, the shifting lever between the rods having projections to engage either of them when shifted laterally, and the latches for holding the rods against movement, said latches being arranged to be operated by the shifting of the lever, substantially as described.

8. In combination, the driving mechanism, the transmitting-shaft 15, the clutches thereon, the connections to said clutches for operating them, the shifting lever arranged to engage and disengage said rods and the plate 56 having non-alined slots 63, 64 connected by an opening 65 and the pawl for holding the lever in the slots and opening, substantially as described.

9. In combination in a traction-engine, the motor-shaft, the transmitting-shafts 15 and 23, the gears 16, 17 and 18 on the shaft 15 having internal clutch-teeth, the companion gears on the shaft 23, the gearing between the shaft 23 and the traction-wheels and the sliding clutch on the shaft 15 with means for operating it within the gears, 16, 17 and 18, substantially as described.

10. In combination, the motor-shaft, the transmitting-shafts 15 and 23, the gears 16, 17 and 18 on the shaft 15, the sliding clutch for fixing either of the gears to the shaft 15, the gear 21 fixed to the shaft 23 meshing with the gear 18 and having the bevel-gear on its inner side, the gears 19 and 20 fixed together and connected to the hub 95 loose on the shaft, the pinions 93 carried by the gear 19 and meshing with the bevel-gear of the gear 21, the loose gear 97 meshing with the pinions 93, the gearing between the shaft 23 and one traction-wheel and the gearing between the gear 97 and the other traction-wheel, substantially as described.

11. In combination in a traction-engine, the frame, the driving mechanism and the wheels having transverse and inclined ribs thereon, substantially as described.

12. In combination in a traction-engine the two traction-wheels, the shaft 23 connected with one, the gear 21 fixed on the shaft 23 for driving one wheel, the gear 97 loose on the shaft and connected with the other wheel, the driving-gearing and the rolling or compensating connection between the gears 97 and 21 consisting of the pinions 93, substantially as described.

In testimony whereof I affix my signature in presence of two witnesses.

CHARLES QUAST.

Witnesses:
JOHN J. CRAWLEY,
C. W. HABERMAN.